US 9,095,208 B1
Aug. 4, 2015

(12) United States Patent
Lee et al.

(54) TABLETOP SYSTEM

(71) Applicant: AGIO INTERNATIONAL COMPANY, LTD., Kowloon (HK)

(72) Inventors: Haidy Lee, Guangdong Province (CN); Jiasheng Huang, Guangdong Province (CN)

(73) Assignee: Agio International Company, Limited, Hong Kong (HK)

( * ) Notice: Subject to any disclaimer, the term of this patent is extended or adjusted under 35 U.S.C. 154(b) by 0 days.

(21) Appl. No.: 14/298,079

(22) Filed: Jun. 6, 2014

Related U.S. Application Data

(63) Continuation of application No. 13/305,065, filed on Nov. 28, 2011, now abandoned.

(51) Int. Cl.
B29C 47/00 (2006.01)
A47B 13/08 (2006.01)
B32B 37/14 (2006.01)

(52) U.S. Cl.
CPC ............... *A47B 13/08* (2013.01); *A47B 13/083* (2013.01); *B32B 37/14* (2013.01); *A47B 2200/001* (2013.01)

(58) Field of Classification Search
CPC ...................................................... B29C 66/54
USPC ........................................................ 156/245
See application file for complete search history.

(56) References Cited

U.S. PATENT DOCUMENTS

| | | |
|---|---|---|
| 1,684,966 A | 9/1928 | O'Conor |
| 1,708,080 A | 4/1929 | Caldwell |
| 3,062,604 A | 11/1962 | Hodgen |
| 3,150,032 A | 9/1964 | Rubenstein |
| 3,324,213 A | 6/1967 | Anfinset |
| 3,421,679 A | 1/1969 | Joseph |
| 3,649,423 A | 3/1972 | Wilton |
| 3,719,157 A | 3/1973 | Aroocha et al. |
| 3,884,737 A | 5/1975 | Bransford, Jr. |
| 3,931,213 A | 1/1976 | Kaminski et al. |
| 4,089,783 A | 5/1978 | Holyoak |
| 4,188,428 A | 2/1980 | Wolf |

(Continued)

FOREIGN PATENT DOCUMENTS

CN 201238747 2/2009

OTHER PUBLICATIONS

Office Action from parent dated Apr. 16, 2013.

(Continued)

*Primary Examiner* — Matthew Ing
(74) *Attorney, Agent, or Firm* — Williams Mullen

(57) ABSTRACT

A tabletop system having a metal frame with at least one horizontally oriented transverse member and a rim member defining a general shape of a tabletop. At least one fiber mesh layer, fabric felt and at least one layer of adhesive binder is affixed to the underside of spaced apart decorative elements. Vertical rim elements envelope the perimeter providing the outer surface of the tabletop. The metal frame has at least one C-channel with retention tabs defining an opening into a base cavity. The base cavity and opening are filled with adhesive binder material and cured before placing the frame assembly into the binder layer of the decorative elements where the rim of the frame member is smaller than the perimeter of the vertical element which is then interposed with a mesh strip and binder. The retention tabs mechanically secure the tabletop to the frame system.

14 Claims, 5 Drawing Sheets

(56) References Cited

U.S. PATENT DOCUMENTS

| | | |
|---|---|---|
| 4,456,944 A | 6/1984 | Rooklyn |
| 4,509,651 A | 4/1985 | Prindle |
| 4,624,815 A | 11/1986 | Moufarrege |
| 5,034,256 A | 7/1991 | Santiso et al. |
| 5,080,960 A | 1/1992 | Smorada |
| 5,271,338 A | 12/1993 | Bonham |
| 5,394,808 A | 3/1995 | Dutro et al. |
| 5,493,976 A | 2/1996 | Hammond |
| 5,759,658 A | 6/1998 | Piekos |
| 5,976,670 A | 11/1999 | Fugazzi |
| 6,058,854 A | 5/2000 | Tarnay et al. |
| 6,113,199 A | 9/2000 | Foot |
| 6,758,148 B2 | 7/2004 | Torrey et al. |
| 6,837,171 B1 | 1/2005 | Clark et al. |
| 6,915,749 B2 | 7/2005 | Chang |
| 7,004,066 B2 | 2/2006 | Poo |
| 7,036,439 B2 | 5/2006 | Poo |
| 7,472,655 B2 | 1/2009 | Leng |
| 2004/0118792 A1 | 6/2004 | Herring |
| 2005/0173597 A1 | 8/2005 | Farrell et al. |
| 2005/0229821 A1 | 10/2005 | Usselmann |
| 2007/0094963 A1 | 5/2007 | McDonald |
| 2007/0131634 A1 | 6/2007 | Markle et al. |
| 2007/0215896 A1 | 9/2007 | Sun et al. |
| 2007/0227416 A1 | 10/2007 | Wang |
| 2008/0100113 A1 | 5/2008 | Kropfreiter et al. |
| 2009/0120334 A1 | 5/2009 | Wang |
| 2010/0229765 A1 | 9/2010 | Shafer |

OTHER PUBLICATIONS

Office Action from parent dated Aug. 26, 2013.
Office Action from parent dated Nov. 8, 2013.
Office Action from parent dated Mar. 6, 2014.
Advisory Action from parent dated May 14, 2014.

TABLETOP SYSTEM

CROSS-REFERENCE TO RELATED APPLICATIONS

This application is a continuation of U.S. patent application Ser. No. 13/305,065, filed Nov. 28, 2011.

STATEMENT REGARDING GOVERNMENT SUPPORT

Not applicable

BACKGROUND OF THE INVENTION

1. Field of the Invention

Embodiments of the present system relate generally to a tabletop, and more particularly to a tabletop that is reinforced with a metal frame.

2. Description of the Background

Traditionally, tabletops have been made of wood. However, wood tabletops are often subject to deterioration due to acidic, basic, air or water conditions over time. Therefore, tabletops, especially those for outdoor uses, are now made of other materials such as plastics, metals, or composite materials.

Metal, plastic, or combinations form one category of tables. Because plastic materials are light weight and can more readily withstand harsh environmental conditions, the majority of tabletops for outdoor use are currently made of plastic materials. If such lighter materials are employed, sufficient supporting strength and rigidity cannot be achieved without additional structure. Some plastic designs include a metal base plate, with the object of having sufficient strength to avoid warping or bending, especially for larger tables. However, tabletops made of bulky plastic materials and large supporting plates are too heavy, especially for portable tables. It is still necessary, however, for such tables to provide sufficient strength and rigidity to support normal activities without warping or bending.

In contrast, some outdoor tabletops include decorative tile or stone top layers. Conventional tiling methods have not proven practical for the manufacture and distribution of consumer products. Therefore, some of these tables have been made with cement board as a base plate. These tables typically include a magnesium silicate plate with magnesium oxide (MgO) as the main component, or other similar composite plate. The tabletop made of such material remains reasonably flat, but only for smaller size tables, up to about 20 or 30 inches in diameter. If such a plate is used in larger tables (e.g., having diameters of 42 inches and up to 80 inches for a rectangular table top), then the table may warp in extreme temperatures. This is because the resin included as a binder or media to adhere the support plate to a decorative stone layer can expand when the temperature increases and contract when the temperature drops. If the base plate, being adhered to the resin, is flexible, then it will tend to bend with resin and warp the table.

Some tabletops with decorative elements have been made using a metal plate, which is strong and can resist bending, but adds significant weight to the table. In addition, the metal plate usually does not have good adhesion with the resin and may separate from the resin easily. Glue has been used to attempt to keep the plate adhered to the stone top. In some cases, when a much stronger table is desired, a single or double frame underneath of the plate may be used to provide additional strength. Yet this only adds to the weight, complicating shipping and expense.

The type of binder used for outdoor tabletops may also be a factor in warping. Polyester resin is a frequently used binder due to its low cost. The drawback of polyester resin is that it tends to expand and/or contract significantly with changes in temperature. If the frame does not provide sufficient resistance to bending, the whole table will warp. If the deformation and temperature cycling is frequent, even with a strong frame the table may crack.

Thus due to expansion and contraction of the polymer binders and the support frames, the decorative stone components often become loose and fall off. Vertical side or rim stones decorating the outside of tabletops are particularly prone to losing adhesion.

Thus, there is a need for a tabletop system for permanently adhering decorative stone.

SUMMARY OF THE INVENTION

An embodiment of this tabletop system has a substantially horizontally oriented top layer with a defined perimeter and a top layer. The top layer has a one or more decorative top elements arranged in a desired horizontal pattern facing upwardly so as to expose a top surface. If the one or more decorative top elements are a plurality, they may define gaps between the top elements. A first horizontal mesh sublayer may be disposed under and in contact with a bottom or underside surface of the top elements. A first horizontal sublayer of binder is disposed under and in contact with the first horizontal mesh sublayer providing a surface for a horizontal felt sublayer, optionally having an opening of less than 1 mm, to be disposed under and in contact with the first horizontal sublayer of binder; a second horizontal sublayer of binder may be disposed under and in contact with the horizontal felt sublayer.

The binder saturates and permeates the first horizontal mesh sublayer and the horizontal felt sublayer, and contacts the bottom surface of the top elements, optionally filling any gaps between embodiments having a plurality of top elements and binding the top layer sublayers together with the top elements. The binder filling in the base cavity is curred to a solid state. The binder's thickness for the second sublayer may be about 1 to 3 mm.

A substantially vertically oriented rim layer may be disposed substantially about the perimeter of the top layer. The rim layer may have one or more decorative rim elements arranged in a desired vertical pattern about a perimeter of the top layer and facing outwardly so as to expose an outward surface. The decorative vertical rim elements, if a plurality, may define gaps between the elements and the gaps may be filled by the binder. A vertical mesh strip sublayer is disposed inward of and in contact with the inner surface of the vertical rim elements. A rim sublayer of binder is disposed inward of and in contact with the vertical mesh strip. The binder saturates and permeates the vertical mesh strip sublayer, contacting the inward surface of the rim elements and binding the rim layer sublayers together with the rim elements.

There is also a frame system with a rigid rim member having an upwardly opening C-channel running longitudinally along the rim member and further defining a side opening C-channel running longitudinally along the rim member, the upwardly opening C-channel mechanically separate from the side opening C-channel (i.e., not structural in communication or the same structure.) The rim member is configured in a desired pattern relative to the perimeter with an outwardly facing side opening C-channel. A rigid transverse member defines an upwardly opening C-channel running longitudinally along the transverse member, where the transverse member is fixed to the rim member in a coplanar manner.

The rim member and transverse member define a base cavity within each of the C-channels; the base cavity has a desired width and height relative to the opening. The rim member and the transverse member further having retaining tabs running longitudinally along the openings of the C-channels and projecting into the openings such that the width of the opening is less than the width of the base cavity. The upwardly opening C-channels are filled with binder and are open to the second horizontal sublayer of binder, such that the binders contact thereby adhering the upward surface of the rim member and transverse member to the top layer.

The outwardly opening C-channel is filled with binder and is open to the rim sublayer of binder, such that binder substantially fills the base cavity of the side opening C-channel so that the binder contacts, thereby adhering the perimeter of the outward surface of the rim member and the vertically oriented rim layer. Optionally, at least one of the C-channel openings may be between 10 percent and 90 percent of the base cavity width. The retaining tabs of the C-channels mechanically retain binder within the base cavities may optionally have a length of about 2 to 5 mm.

Another embodiment is a tabletop system having a substantially horizontally oriented tabletop with a perimeter. The tabletop may have a substantially solid tabletop stratum with a horizontal layer of binder disposed under and in contact with the underside of the tabletop stratum. A first horizontal mesh sublayer may be disposed under and in contact with a bottom surface of the top elements. A first horizontal sublayer of binder may be disposed under and in contact with the first horizontal mesh sublayer providing a surface for a horizontal felt sublayer to be disposed under, and in contact with, the first horizontal sub layer of binder. A substantially vertically oriented rim layer may be disposed substantially about the perimeter, the rim layer having one or more decorative rim elements arranged in a desired vertical pattern about a perimeter of the top layer and facing outwardly so as to expose an outward surface. A vertical mesh strip may be disposed inward of and in contact with an inward surface of the rim elements with a rim sublayer of binder disposed inward of and in contact with the vertical mesh strip. A binder is applied and saturates and permeates the vertical mesh strip, contacting the inward surface of the rim elements and binding the rim layer sublayers together with the rim elements.

A frame system is provided, the system having a rigid rim member defining an upwardly opening C-channel running longitudinally along the rim member and further defining a side opening C-channel running longitudinally along the rim member. The upwardly opening C-channel is mechanically separate from the side opening C-channel. The rim member is configured in a desired pattern relative to the perimeter with the side opening C-channel facing outwardly. A rigid transverse member defines an upwardly opening C-channel running longitudinally along the transverse member. The transverse member is fixed to the rim member in a coplanar manner. The rim member and transverse member define or include a base cavity within each of the C-channels having a desired width and height. The rim member and the transverse member further have retaining tabs running longitudinally along the openings of the C-channels and projecting into the openings such that the width of the opening is less than the width of the base cavity.

The upwardly opening C-channels are filled with binder and are open to the first horizontal layer of binder such that the binders contact, thereby adhering the upward surface of the rim member and transverse member to the top stratum. The outwardly opening C-channel may also be filled with binder and are open to the rim sublayer of binder, substantially filling the base cavity of the side opening C-channel such that the binder in the outwardly opening C-channel contacts the binder of the vertical mesh strip adhering the perimeter of the outward surface of the rim member and the vertically oriented rim layer. The retaining tabs of the C-channels thus mechanically retain binder within the base cavities. These tabs may have a length of about 2 to 5 mm. The mesh opening on the tabletop system may be about 5 to 6 mm.

Another embodiment is a tabletop having a substantially horizontally oriented top layer with a perimeter. The top layer may have one or more decorative top elements arranged in a desired horizontal pattern about a perimeter of the top layer, facing upwardly so as to expose a top surface. If a plurality of decorative elements is desired, they may define gaps between the top elements. A horizontal mesh sublayer may be disposed under and in contact with a bottom surface of the top elements, where a first horizontal sublayer of binder is disposed under and in contact with the horizontal mesh sublayer. A horizontal felt sublayer is disposed under and in contact with the first horizontal sub layer of binder and a second horizontal sublayer of binder disposed under and in contact with the horizontal felt sublayer. Some optional embodiments may include a second mesh layer.

The first sublayer of binder and second horizontal layer of binder saturate and permeate the horizontal mesh sublayer, the horizontal felt sublayer, and contacts the underside or bottom surface of the one or more top elements, binding the top layer sublayers together with the top elements.

Further there is a frame system having at least one rigid member defining an upwardly opening C-channel running longitudinally along the rigid member, where the rigid member is configured in a desired pattern relative to the perimeter. The rigid member defines a base cavity within the C-channel, with the base cavity having a desired width and height relative to the opening. The rigid member further has retaining tabs running longitudinally along the opening of the C-channel and projecting into the opening such that the width of the C-channel opening is less than the width of the base cavity.

The upwardly opening C-channel of the frame system is open to the second horizontal sublayer of binder, such that binder substantially fills the base cavities of the upwardly opening C-channel, and adheres to an upward surface of the rigid member. The retaining tabs of the C-channel mechanically retain binder within the base cavity.

In yet another embodiment, a method is provided for making a tabletop by providing a substantially horizontally oriented top layer with a perimeter. The top layer may be constructed by arranging a plurality of decorative top elements in a desired horizontal pattern facing upwardly, so as to expose a top surface with gaps between the top elements. Disposing a horizontal mesh sublayer under and in contact with a bottom surface of the top elements and additionally disposing a first horizontal sublayer of binder under and in contact with the horizontal mesh sublayer. A horizontal felt sublayer is disposed under and in contact with the first horizontal sub layer of binder and in contact with the horizontal felt sublayer.

The binder of the first and second horizontal sublayers saturates and permeates the first horizontal mesh sublayer, the horizontal felt sublayer and contacts the bottom surface of the top elements, filling any gaps between an optional plurality of top elements, and binds the top layer sublayers together with the top elements.

A substantially vertically oriented rim layer may be provided and disposed substantially about the perimeter. The rim layer may have one or more decorative rim element arranged in a desired vertical pattern about a perimeter of the top layer and facing outwardly so as to expose an outward surface. A vertical mesh strip may be applied inward of, and in contact with, an inward surface of the rim elements, with a rim sublayer of binder inward of and in contact with the vertical mesh strip.

The binder of the rim sublayer saturates and permeates the vertical mesh strip, contacts the inward surface of the rim elements, and binds the rim layer sublayers together with the rim elements.

A frame system is provided having at least one rigid transverse member defining an upwardly opening C-channel running longitudinally along the rigid transverse member. A rim member having a side opening C-channel running longitudinally along the rim member, the upwardly opening C-channel, the rim member with a side opening C-channel where the rim member is configured in a desired pattern relative to the perimeter with the outwardly facing side opening C-channel. A base cavity is provided within each of the C-channels. The base cavity has a desired width and height relative to the opening. The rigid member further has retaining tabs running longitudinally along the openings of the C-channels and projecting into the C-channel openings such that the width of the opening is less than the width of the base cavity.

The base cavity of the upwardly opening C-channel of the frame system are filled with binder, where the C-channel is open to the second horizontal sublayer of binder and adheres to an upward surface of the rigid member. The side opening C-channel is filled with binder and is open to the rim sublayer of binder, such that binder substantially fills the base cavity of the side opening C-channel and adheres to an outward surface of the rim member and the perimeter of top layer. The binder filling the base cavities is cured to a solid state and the cured binder is retained mechanically within the retaining tabs within the base cavities.

The "C-channel" described may be formed by a base cavity that is open longitudinally along or to a side of the base cavity, and in which the longitudinal opening is narrower in width than the maximum inner diameter or width of the base cavity. The base cavity may be a variety of cross sections or shapes, so the width or diameter should be considered as relative or effective for the shape. Two tabs may define the opening width, and which are generally equidistant from the inner surface of the base cavity. FIG. 2a shows the defined parameters, although the base cavity need not be a "boxed" shape or particular cross section as shown, and may have inner and or outer curved surfaces as shown in an end view.

Embodiments of the system relate to a tabletop for use in a table that includes a metal supporting frame having at least one portion that forms a substantially horizontally oriented transverse member and an edge. The support frame transverse member and rim contains one or more C-channel that is filled with the same adhesive binder as the underside and inside surface of the stone structure and rim. Therefore the exposed adhesive binder in the C-channel is bonded directly to the adhesive binder of the top surface/decorative elements. This surface is of sufficient area to provide desired adhesion strength to the adhesive binder bond the decorative stone. The C-channel mechanically captures the adhesive binder bond of the support frame and the adhesive binder joined to the decorative stone.

The tabletop further may include a layer of horizontally oriented fiber mesh and fiber fabric affixed to the top of the supporting frame transverse member by adhesive binder material, the binder material in contact with the adhesive material within the C-channel. The substantially horizontal top surface (e.g., decorative stone) is positioned above and proximate to the transverse member, and a layer of horizontally oriented fiber mesh affixed to the bottom of the decorative layer by adhesive material, a substantially horizontal layer of adhesive material interposed between and contacting the at least one horizontally oriented transverse member and the horizontal decorative layer so that the layers of fiber fabric or fiber mesh are embedded within the adhesive binding material. The decorative layer is adhered to the at least one horizontally oriented transverse member.

The adhesive material may be a binder material, such as resin formed of an unsaturated polyester resin, a vinyl ester resin, or an epoxy resin. The decorative layer typically may be formed of one or more of stone, marble, clay, slate, granite, tile, ceramic, or porcelain. The supporting frame may be formed of aluminum, iron, or steel and the fiber fabric may have a random orientation or have a woven pattern. A metal mesh may be used in place of the fiber fabric.

DETAILED DESCRIPTION

Figure 1A:
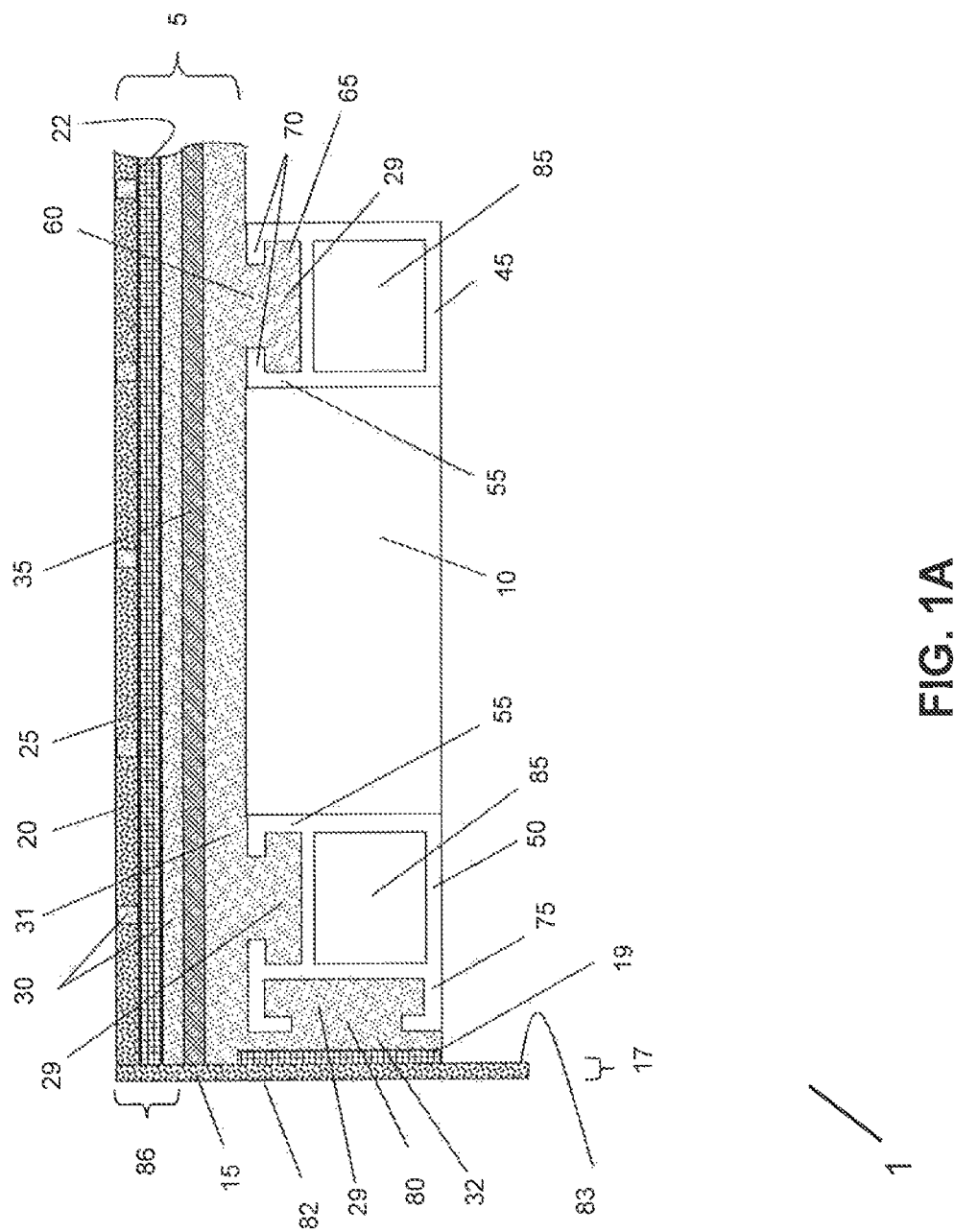
FIG. 1A is a cross-section view of a tabletop and frame system.

FIG. 1A is a cross-section view of an embodiment of tabletop 1 showing major sub assemblies or system components: a substantially horizontal oriented top layer 5 (with decorative top elements 20, such as a stone or tile), a frame system 10, and substantially vertically oriented rim layer 17 (with decorative rim elements 15, such as vertically oriented stone or tiles) as an embodiment. The top layer 5 may be a single (substantially solid top stratum) or plurality of substantially horizontally oriented decorative top elements 20, a horizontal mesh sublayer 25, a first horizontal sublayer of adhesive binder (i.e., with layers of adhesive binder capable of binding together to form a unitary whole) 30, a felt sublayer 35 and a second sublayer of binder 31.

In assembly, one or more decorative top elements 20 may be placed in a desired pattern (facing upwardly for the end product, but possibly face down during assembly) on a surface where the top element underside 22 may be covered with the first horizontal mesh sublayer 25 of tabletop 1. One or more vertical decorative rim elements 15 may be placed perpendicular to and against an inner edge of the decorative top elements 20. In embodiments in which the one or more elements comprise a plurality, the decorative top elements 20 or vertical rim elements 15 may be placed so as to define a gap between each decorative top element 20 and vertical rim element 15, respectively. A first horizontal sublayer of binder 30 may be then added to the mesh sublayer 25 and smoothed such that the first horizontal sublayer of binder 30 covers, permeates and flows through the openings in the horizontal mesh sublayer 25 and contacts the decorative top element underside 22 and fills any gaps defined by the decorative top elements 20, binding together the decorative top elements 20 of the tabletop 1. Horizontal mesh sublayer 25 may be polymer or metal and may define openings that range from about 2 mm to about 8 mm in opening size, and the first horizontal mesh sublayer 25 may be of varying shapes and perimeter dimensions. Felt sublayer 35 may be disposed under and covering the underside of first horizontal sublayer of binder 30. Felt sublayer 35 generally defines smaller woven openings than mesh sublayers 25. A second sublayer of binder 31 is then applied to the felt sublayer 35 such that the second sublayer of binder 31 permeates and flows through the felt sublayer 35 contacting and adhering to the first sublayer of binder 30 and mesh sublayer 25. The second sublayer of binder 31 may then smoothed to a depth ranging from about 1 mm to about 3 mm. Binder 29 material may be an unsaturated polymer resin with suitable curing agents. The top layer 5 may be a solid stratum 86 composition and having a horizontal mesh sublayer 25 and a first horizontal layer of binder 30 as described in the summary. While not required in most embodiments, some may choose to include an optional second horizontal mesh layer 40 disposed directly under felt sublayer 35 to be bound by binder in contact.

A layer of substantially vertically oriented vertical rim element 15 may be disposed perpendicular to and substantially about the perimeter of the horizontal decorative top element 20. The vertical rim element 15 is a plurality of decorative elements arranged vertically in a desired pattern about the perimeter of the top layer 5 and facing outwardly so as to expose the desired pattern on an outward surface 82, with gaps between the elements of the vertical rim element 15. A vertical mesh strip 19 is disposed inward of and in contact with an inner surface 83 of the vertical rim elements 15. A rim sublayer of binder 32 is disposed inward of and in contact with the vertical mesh strip 19. The binder 30 saturates and permeates the vertical mesh strip 19, contacting the inner surface 83 of the vertical rim element 15, fills the gaps between the vertical rim elements 15 and binds the vertical rim elements 15, vertical mesh strip 19 and binder 32 sublayers together. FIG. 1A illustrates an embodiment in which mesh sublayer 25 and vertical mesh strip 19 are separate, but this is not a requirement; felt sublayer 35 may be configured to permit mesh strip 19 to be continuous extension of mesh sublayer 25, folded into vertical orientation, for example.

Figure 1B:
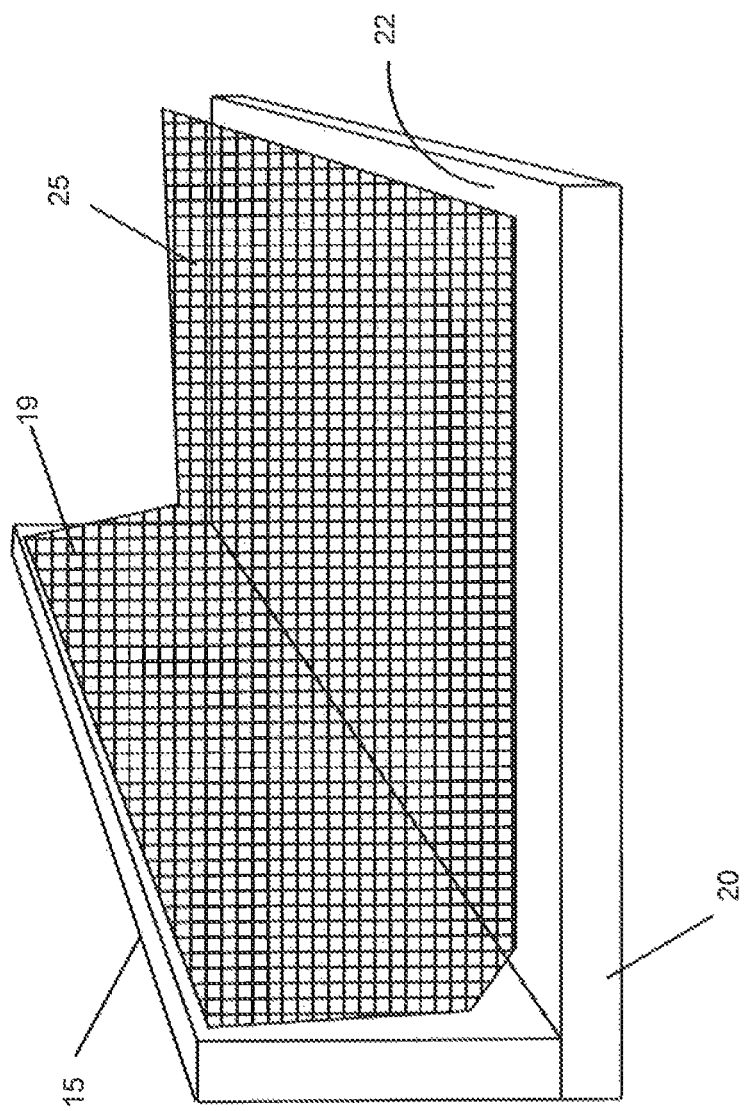
FIG. 1B is a detail of an alternative embodiment.

In some embodiments, as shown in FIG. 1B, vertical rim element 15 may be disposed perpendicular to, substantially about the perimeter of the horizontal top elements 20, while in contact with top element underside 22. For example, an adhesive (not shown), such as an epoxy resin, may be used to adhere vertical rim elements 15 to top element underside 22 for the horizontal top elements 20 about the perimeter. Horizontal mesh sublayer 25 and vertical mesh strip 19 may be single, continuous piece, configured along vertical rim elements 15 and horizontal top elements 20; the continuous aspect contributes strength to the adhesive joint between vertical rim elements 15 and to element underside 22 of horizontal top elements 20. Continuous coverage over the complete area has shown the greatest strength for this embodiment.

The frame system 10 may be metal, plastic or resin, extruded or cast, and includes at least one horizontally oriented transverse member 45 and a rigid rim member 50 that is coupled with, in a co-planar manner, and forms a perimeter that surrounds the at least one horizontally oriented transverse member(s) 45 defining the shape of the tabletop 1. The rigid rim member 50 has at least one upwardly opening or top C-channel 55 and running longitudinally along the rim member 50 and at least one side opening or edge C-channel 75 facing outwardly. The rigid transverse member 45 has at least one top C-channel 55 opening upwardly running longitudinally along the transverse member 45. At least one horizontally oriented transverse member(s) 45 is coupled with the rim member 50 in a coplanar manner adding to the overall stability, strength, and rigidity of the frame system 10. Transverse member 45 has at least one top C-channel 55 in a linear direction along at least one side of the transverse member 45 having a linear opening 60 along the transverse member 45 the width of which is smaller than a base cavity 65 width and is in communication with the base cavity 65 which is of a desired width and height. Top C-channel 55 may be of any shape along the side of the transverse member 45 or rim member 50 such that the base cavity 65 has a width greater than the opening 60 and retention features such as the retaining tabs 70 described. Tab(s) 70 define the width of opening 60 in relation to the width of the base cavity 65 (FIG. 2a) and form a mechanically retentive feature for binder 29 within the base cavity 65 by extending along the linear axis perpendicular to the top C-channel 55. Opening 60 may have a width from about 10% to 90% in relation to the width of the base cavity 65. The transverse member 45, alternatively, may be a single conduit 85 with no C-channel.

Frame system 10 is constructed in the desired shape of the tabletop 1 with the top C-channel(s) 55 of transverse member 45 oriented such that the opening 60 is unitarily directed such that the opening 60 faces the second sublayer of binder 31 of the top element underside 22. In this embodiment, the frame system 10 is prepared where binder 29 is inserted into the transverse member 45 top C-channel 55 and allowed to cure. The cured binder 29 in each C-channel 55 is processed so that the binder 29 is planar to the outside of the C-channel 55 surface. While the second sublayer of binder 31 is viscous, frame system 10 and at least one transverse member 45 is then placed with opening 60 toward the second sublayer of binder 31 where the second sublayer of binder 31 adheres to the top layer 5 and the binder 29 in the top C-channel 55 through the opening 60. Since the second sublayer of binder 31 of the top layer 5 and binder 29 within the top C-channel 55 is the same composition, cured adhesion is ensured, securing the top layer 5 and the frame system 10. Tabs 70 mechanically retain the cured binder 29 within the top C-channel 55 and are generally 2-5 mm in length.

Also shown in FIG. 1A, the rim member 50 is illustrated with at least one top C-channel 55 facing the top layer 5 and at least one edge C-channel 75 outwardly facing the vertical rim elements 15. Edge C-channel 75 is prepared with binder 29, the same as the top C-channel 55. When the frame system 10 is placed within the confines of the vertical rim layer 17, there is a gap formed between the rim member 50 edge C-channel 75 and the inner surface 83 of the vertical rim elements 15. Vertical mesh strip 19 is placed in the gap and rim sublayer of binder 32 and vertical rim element 15 adhere to the binder 29 in the edge C-channel 75 through the edge C-channel opening 80. Since the rim sublayer of binder 32 and the binder 29 within the edge C-channel 75 is the same composition, adhesion is ensured. Tabs 70 mechanically retain the binder 29 within the edge C-channel 75 base cavity 65 thereby securing the vertical rim elements 15 adhered to the rim member 50. Conduit 85 is mechanically separate from the base cavity 65 of all C-channels 55, 75, and is described further in FIGS. 2a-2c. It should be noted that the relative dimensions of the components of FIG. 1A are exaggerated for clarity of description and in no way should be construed as limiting.

Opening 60 and edge C-channel opening 80 may be the same or of different sizes and may encompass more than one C-channel 55, 75 or opening 60, 80. The ratio of the width of the opening 60, 80 may vary in relation to the base cavity 65 of the individual C-channels 55, 75 where the opening 60, 80 is always smaller than the width of the base cavity 65. The resulting tabs 70 provide mechanical retention for tabletop 1 and vertical rim elements 15.

Figure 2A:
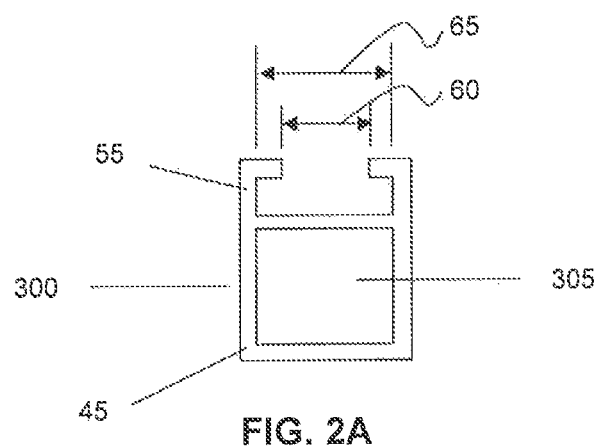
FIG. 2A is a cross-sectional view of a support frame with a single C-channel.

FIG. 2A is a cross-sectional view of an embodiment of transverse member 45 with a single C-channel 55. The horizontally oriented transverse member 45 is illustrated in this embodiment as a horizontal tube 300 where the top C-channel 55 is mechanically separate from the tube conduit 305 and upwardly facing as if it were positioned under a standing tabletop 1 (not shown). It should be noted that no binder 29 enters the tube channel. For clarity, opening 60 and base channel 65 widths are defined and apply to edge C-channel 75 and edge C-channel opening 80 in their entirety. The C-channel opening 60 is between 10 percent and 90 percent of the width of the base cavity 65.

Figure 2B:
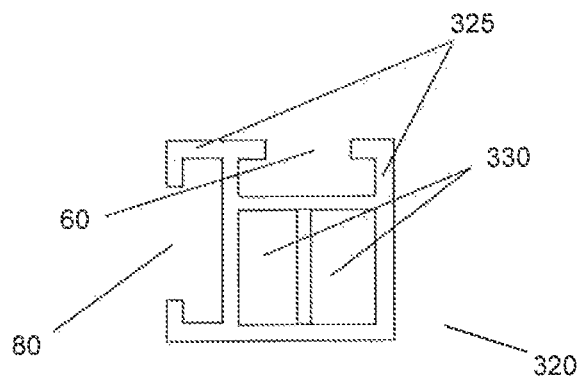
FIG. 2B is a cross-sectional view of a rim support frame with a double C-channel perpendicular to each other.

FIG. 2B is a cross-sectional view of an embodiment with a combined transverse and rim frame 320 having more than one C-channel 325 with openings 60, 80 shown perpendicular to each other. This frame 320 illustrates a more than one enclosed conduit 330, but may have only one enclosed conduit 330. In an alternative embodiment, an enclosed conduit 330 may have at least one C-channel 325 associated along any enclosed conduit 330 side. It should be noted that no binder 29 enters the enclosed conduit 330.

Figure 2C:
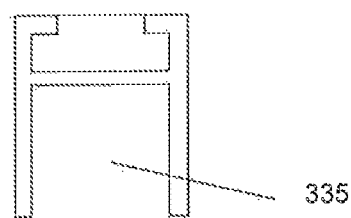
FIG. 2C is a cross-sectional view of a support frame with a single C-channel within an "H" beam structure.

FIG. 2C shows another alternative embodiment where the enclosed tube conduit 305 may be open on at least one side to become an open conduit 335 such as an "H" shape as seen from the end. It should be noted that no binder 29 enters the open conduit 335.

In all instances, the respective C-channel is mechanically separate from any tube conduit 305 (FIG. 2A), enclosed conduit 330 or open conduit 335.

Figure 3A:
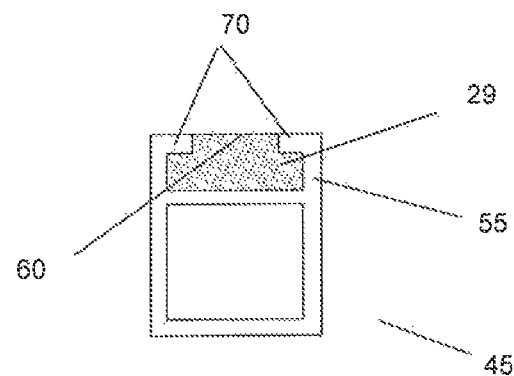
FIG. 3A is a cross-sectional view of a frame system member with a single C-channel filled with bond.

FIG. 3A is a cross-sectional view of a transverse member 45 with a top C-channel 55 filled with binder 29. As described previously, binder 29 is poured into the transverse member 45 C-channel 55 until it is filled and allowed to cure. Binder 29 exposed through opening 60 is then processed to provide a smooth surface generally parallel to the outer surface of the tabs 70. Note that the tabs 70 may extend from the edge about 2-5 mm toward the center defining the width of the opening 60.

Figure 3B:
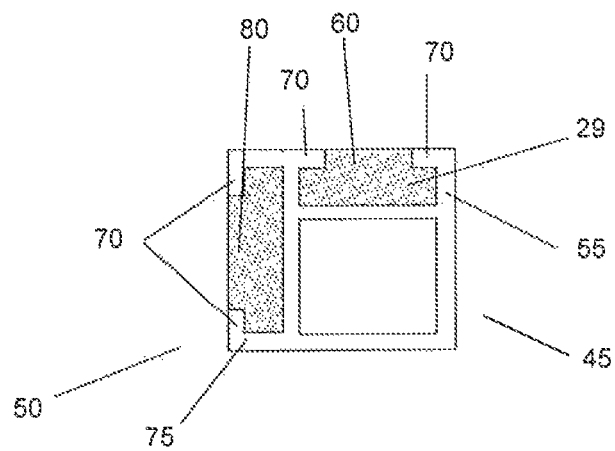
FIG. 3B is a cross-sectional view of a frame system 10 transverse member 45 with a top C-channel 55 filled with binder 30 and a rim 50 with an edge C-channel 75.

FIG. 3B is a cross-sectional view of an embodiment of transverse member 45 with a top C-channel 55 filled with binder 29 and a rim member 50 with an edge C-channel 75. Binder 29 is poured into the transverse member 45 C-channel 55 and allowed to cure. Binder 29 is poured into the edge C-channel 75 and allowed to cure. Binder 29 exposed in openings 60, 80 is then processed to provide a smooth surface generally parallel to the outer surface of the tabs 70 for both C-channel 55 and edge C-channel 75.

The transverse members 45 may be arranged in any manner, so long as they provide sufficient support for the top layer 5. Rim member 50, or additional transverse members 45 may define any shape desired for the perimeter of a tabletop 1. Spaces formed between various transverse members 45 and rim member 50 may be open, reinforced with an inner structure, or may comprise some other desired structure. Any number of transverse members 45 may be used within the scope of the present disclosure.

A sufficient amount of first sublayer of binder 30 surrounds and fills any optional gaps between individual spaced apart decorative top elements 20. The use of individual spaced apart decorative top elements 20 enhances the adhesion with the first horizontal sublayer of binder 30. For instance, if a single piece decorative top element 20 were to be used, there would be a likelihood of separation from first sublayer of binder 30 due to variation in thermal expansion or contraction. By using a plurality of spaced apart decorative top elements 20, however, the thermal expansion or contraction effect is substantially reduced. The first sublayer of binder 30 saturates the horizontal mesh sublayer 25 affixing it to the decorative top elements 20. The second sublayer of binder 31 further saturates and adheres the felt sublayer 35. Mesh sublayer 25 and felt sublayer 35 (and optional second mesh sublayer 40) are embedded in the first sublayer of binder 30 and second sublayer of binder 31.

The primary function of the horizontal mesh sublayer 25 is to anchor the decorative top elements 20 and to improve the strength of the adhesion between the first sublayer of binder 30 and the one or more decorative top elements 20. The loose weave of the mesh sublayer 25 and the tighter weave of the felt sublayer 35 all permit first sublayer of binder 30 and second sublayer of binder 31 to freely surround and penetrate through the first mesh sublayer 25 and felt sublayer 35. The mesh sublayer 25, also lowers any brittleness and simultaneously enhancing the tensile strength properties of the sublayers of binder 30 and 31. The loose weave of mesh sublayer 25 is also flexible, which can avoid or reduce cracking or chipping of the sublayers of binder 30 and 31, further preventing the whole tabletop 1 from warping and cracking.

The mesh sublayer 25 typically may define or have mesh openings or spaces of about 5 mm by 6 mm, although larger or smaller dimensions may be used as known to those of ordinary skill in the art, depending in part on the size of decorative top element 20. In general, when a woven opening is not generally visible, the material would be considered fabric or felt sublayer 35. Optional second mesh sublayer 40 may be similar.

The felt sublayer 35 may be glass fiber "random" matting, in which the fibers are oriented generally randomly. This type of matting gives great strength in all directions. A second type of felt sublayer 35 material, known as "woven" matting may also be used. Such a felt sublayer 35 is generally tightly woven in a similar manner as a cotton sheet, and defines felt openings of less than 1 mm. The felt sublayer 35 tends to provide greater vertical support strength and rigidity in that deformation stress is randomized along the various fibers. During temperature cycling, the binder sublayer 30 and 31 expands and contracts at a different rate from the frame system 10. This can cause de-lamination of support layers. Even with less planar metal frames, the variation in thermal expansion and contraction properties may cause the binder 30 and/ or 31 to separate from other frame structures in extreme conditions. By adding a sublayer of felt 35, the deformation stress tends to be more randomized and controlled. Further, when the felt sublayer 35 is embedded in cured binder 31, it binds well to transverse members 45 and provides enhanced support strength to a tabletop 1.

The mesh sublayer 25 is typically formed from nylon thread, although other natural or synthetic fibers may be used. For example, the mesh sublayer 25 can be fiber glass formed of continuous fibers, such as those used in electrical insulation, cement, or plastics reinforcement. The mesh sublayer 25 often has the appearance of thin netting. The mesh sublayer 25 typically has a density of about 300 g/m$^2$. Mineral fibers may also be used. During assembly, the mesh sublayer 25 provides temporary fixing to hold the decorative top element 20 in position. Great strength is not needed at that step, but it is important that the first sublayer of binder 30 and second sublayer of binder 31 is able to penetrate through the openings in the mesh sublayers 25 and 40 respectfully and onto the decorative top element 20 to ensure good adhesion.

In some embodiments, the mesh sublayer 25 (and optional mesh sublayer 40) or felt sublayer 35 may also be replaced by a layer of metal screen (not shown). A variety of metals may be used, such as aluminum, steel, iron, or alloys thereof. Preferably, the screen would be sufficiently flexible to lie flat within the first sublayer of binder 30 and second layer of binder 31. Otherwise, portions of the screen might protrude from the sublayer of binder 30 or 31, causing irregularities or exposed screen, which might require grinding and/or painting.

The one or more decorative top elements 20 may further comprise decorative design elements. For example, the decorative top element 20 may be tile, configured to resemble stone or similar materials, etc. The particular design chosen is not a limiting feature of the present disclosure. Although decorative top element 20 is used to describe the visible tabletop 1, the term "stone" may comprise other materials. The decorative top element 20 may include one or more of stone, marble, clay, slate, granite, tile, ceramic, porcelain or a decorative design that resembles stone. The decorative top element 20 may include a mixture of stone powder, coloring powder, and calcium powder to resemble stone.

The one or more decorative top elements 20 are shown adhered to the mesh sublayer 25. The one or more decorative top elements 20 may be formed of a plurality of individual elements 20 that define gaps therebetween.

The first sublayer of binder 30, second sublayer of binder 31, rim sublayer of binder 32 and binder 29 that may be used with the present disclosure include unsaturated polyester resin, vinyl ester resin, epoxy resin, or similar such resins. The binder 30, 31, 32 or 29 may include a pigment to enhance its color. In one example, 1 Kg of resin is added to 7-15 g of an adhesive formed of calcium powder and color pigment. Alternatively, vinyl ester resin and epoxy resin can be used. Fine sand may be added to the resin if a rough texture is desired. A curing agent may be added to speed the drying time of the resin.

Figure 4:
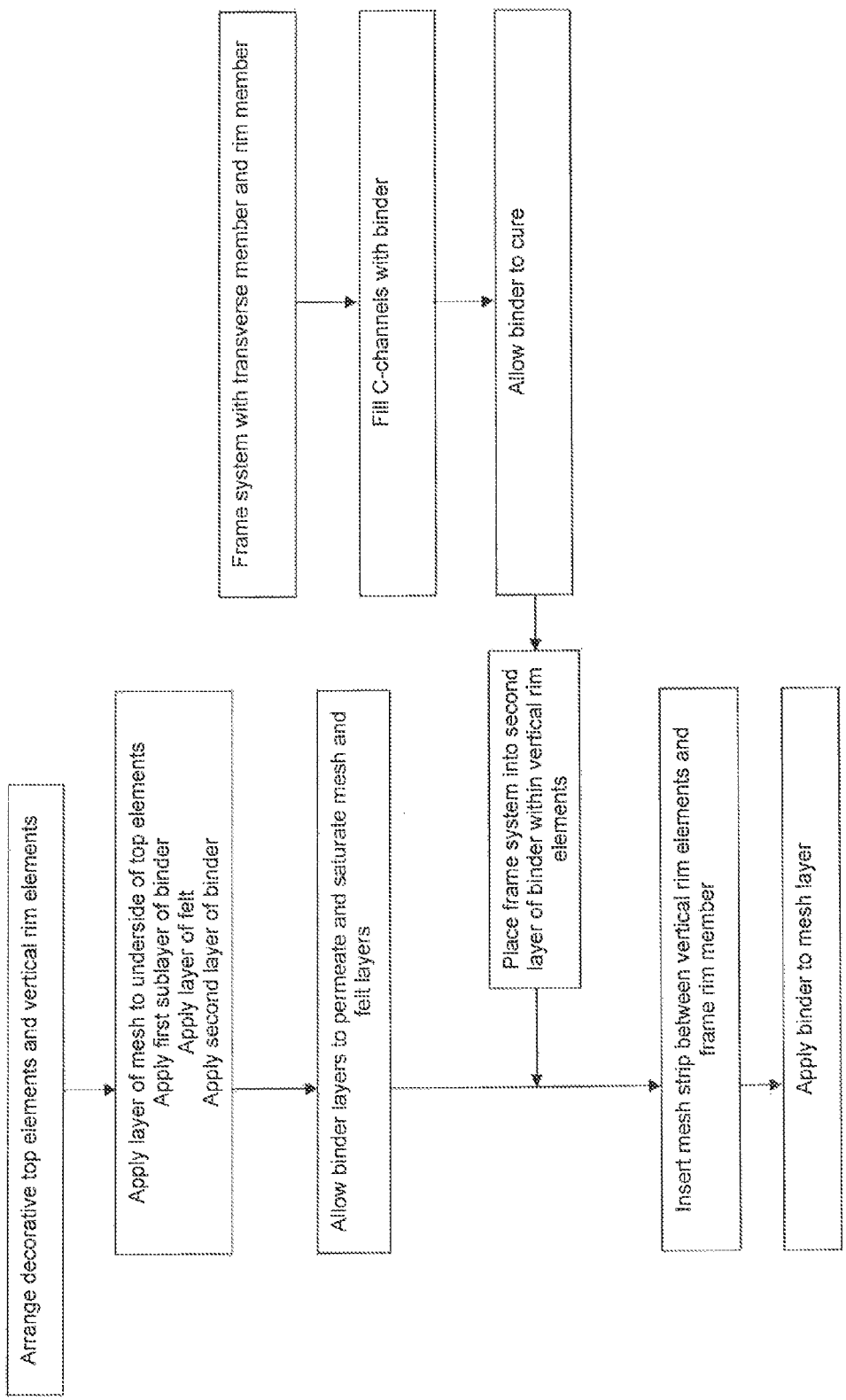
FIG. 4 is a data flow diagram describing a method of creating a tabletop according to an embodiment of the present invention.

FIG. 4 is a process flow diagram of a method of creating a tabletop according to an embodiment of the present disclosure. The first step is to prepare the frame system 10 by pouring binder 29 into the top C-channel 55 and edge C-channel 75 and preparing the binder 29 in a uniform planar condition with the outer surface of the tabs 70. Decorative top element 20 and vertical rim element 15 are placed within a fixture defining the outer shape of the tabletop 1. A first mesh sublayer 25 is placed on the top element underside 22 of the decorative top element 20 and covered with the first sublayer of binder 30. A sublayer of felt 35 is placed on top of the first sublayer of binder 30. A second sublayer of binder 31 is added and smoothed. The frame system 10 that defines the outline of tabletop 1 is then placed into the second sublayer of binder 31. Pressure or weighting may be used on the frame system 10 to ensure that the frame system 10 is flush with the top layer 5. A mesh strip 19 is inserted between the rim member 50 of the frame system 10 and the vertical rim element 15 and rim sublayer of binder 32 poured over the mesh strip 19. The binders 30, 31, 32 and 29 are cured thereby binding the components of the top layer 5 as defined, the frame system 10 and vertical rim element 15. The result is a finished tabletop 1.

In some embodiments, vertical rim element 15 may be disposed perpendicular to, substantially about the perimeter of the horizontal top elements 20 in contact with and adhered to top element underside 22, as discussed above. Horizontal mesh sublayer 25 and vertical mesh strip 19 may be single, continuous piece, configured along vertical rim elements 15 and horizontal top elements 20, preferably with no gaps.

It is to be understood that the disclosed tabletop is not to be limited to the exact configuration as illustrated and described herein. Accordingly, all expedient modifications readily attainable by one of ordinary skill in the art from the disclosure set forth herein, or by routine experimentation therefrom, are deemed to be within the spirit and scope of the disclosure as defined by the appended claims.

What is claimed is:

1. A method for manufacturing a tabletop, the method comprising:
    (a) providing a frame system comprising at least one rigid member defining an upwardly opening C-channel running longitudinally along the rigid member, wherein the upwardly opening C-channel comprises an opening, a base cavity, and retaining tabs running longitudinally along and projecting into the C-channel opening;
    (b) filling the upwardly opening C-channel base cavity with uncured binder;
    (c) curing the binder in the upwardly opening C-channel base cavity;
    (d) providing a top layer; and
    (e) after curing the binder in the upwardly opening C-channel base cavity, attaching the frame system to the top layer.

2. The method of claim 1, wherein the cured binder substantially fills the upwardly opening C-channel base cavity.

3. The method of claim 1, wherein the base cavity has a width and height, and the width of the C-channel opening is less than the width of the C-channel base cavity.

4. The method of claim 1, further comprising forming a smooth surface on the cured binder.

5. The method of claim 4, wherein the smooth surface on the cured binder is substantially planar with the opening of the upwardly opening C-channel.

6. The method of claim 1, wherein attaching the frame system to the top layer comprises orienting the C-channel opening to face the top layer.

7. The method of claim 1, wherein the top layer comprises a perimeter and at least one decorative top element comprising a top surface and a bottom surface.

8. The method of claim 7, further comprising:
    (a) arranging a first mesh sublayer disposed under and in contact with a bottom surface of the top element;
    (b) applying a first horizontal binder sublayer under and in contact with the horizontal mesh sublayer;
    (c) arranging a horizontal felt sublayer under and in contact with the first horizontal sub layer of binder; and
    (d) arranging a second horizontal sublayer of binder under and in contact with horizontal felt sublayer; wherein:
        (1) binder saturates and permeates the first horizontal mesh sublayer and the horizontal felt sublayer, (2) binder contacts the top element bottom surface, and (3) binds the first horizontal mesh sublayer and the horizontal felt sublayer to the top element.

9. The method of claim 8, further comprising forming a smooth surface on the cured binder in the C-channel base cavity.

10. The method of claim 9, wherein attaching the frame system to the top layer comprises contacting the cured binder smooth surface and the second horizontal sublayer of binder.

11. The method of claim 8, further comprising:
(a) providing a rim layer comprising at least one decorative rim element comprising an outward surface and an inward surface;
(b) arranging a vertical mesh strip inward of and in contact with an inner surface of the decorative rim element;
(c) applying a rim sublayer of binder inward of and in contact with the vertical mesh strip, such that binder saturates and permeates the vertical mesh strip, contacts the decorative rim element inner surface, and binds the vertical mesh strip to the decorative rim element; and
(d) attaching the rim layer to the top layer perimeter.

12. The method of claim 11, further comprising:
(a) providing a rigid rim member defining a second upwardly opening C-channel running longitudinally along the rim member and an outwardly opening C-channel running longitudinally along the rim member, the second upwardly opening C-channel mechanically separate from the side opening C-channel; each C-channels comprising an opening, a base cavity, and retaining tabs running longitudinally along and projecting into the C-channel opening;
(b) filling the second upwardly opening C-channel base cavity and outwardly opening C-channel base cavity with uncured binder;
(c) curing the binder in the second upwardly opening C-channel base cavity and outwardly opening C-channel base cavity;
(d) after curing the binder in the second upwardly opening C-channel base cavity, attaching the second upwardly opening C-channel to the second horizontal sublayer of binder of the top layer; and
(e) after curing the binder in the outwardly opening C-channel base cavity, attaching the outwardly opening C-channel to the rim sublayer of binder of the rim layer.

13. The method of claim 12, wherein cured binder substantially fills at least one of the second upwardly opening C-channel base cavity and the outwardly opening C-channel base cavity.

14. The method of claim 12, further comprising forming a smooth surface on at least one of the cured binder in second upwardly opening C-channel base cavity and the cured binder in the outwardly opening C-channel base cavity.

* * * * *